United States Patent [19]

Bauer et al.

[11] Patent Number: 5,551,382
[45] Date of Patent: Sep. 3, 1996

[54] COOLING SYSTEM FOR AN INTERNAL COMBUSTION ENGINE

[75] Inventors: Lothar Bauer, Köln; Werner Lemme, Rösrath; Reinhard Rechberg, St. Augustin; Wolfgang Strusch, Köln; Heinz W. Fuchs, Remscheid; Jürgen Wahnschaffe, Bergisch Gladbach, all of Germany

[73] Assignee: Klöckner-Humboldt-Deutz AG

[21] Appl. No.: 358,083

[22] Filed: Dec. 15, 1994

[30] Foreign Application Priority Data

Dec. 15, 1993 [DE] Germany ............................ 43 42 800.2

[51] Int. Cl.$^6$ ........................................................ F02F 1/36
[52] U.S. Cl. ............................. 123/41.82 R; 123/193.5
[58] Field of Search ............................. 123/41.42, 41.57, 123/41.82 R, 193.5

[56] References Cited

U.S. PATENT DOCUMENTS

| 4,854,276 | 8/1989 | Elsbett et al. | 123/41.42 |
| 5,333,575 | 8/1994 | Olmr | 123/41.57 |

FOREIGN PATENT DOCUMENTS

0268988B1  5/1992  Germany .

Primary Examiner—Noah P. Kamen
Attorney, Agent, or Firm—Hardaway Law Firm PA; Charles L. Schwab

[57] ABSTRACT

This invention relates to a reciprocating internal combustion engine having a cylinder crankcase with a cylinder head with is designed to reduce the manufacturing and spare parts cost. A single design unified cylinder head is employed for liquid cooling and air cooling, the cylinder head having both cooling spaces for the liquid coolant and cooling fins for the cooling air. Coolant passageways in the cylinder head are connected to coolant spaces in the cylinder block portion of the cylinder crankcase by way of openings in the upper end of the cylinder block and openings in the cylinder head gasket which permit flow of coolant to the annuli in the cylinder head. In addition to the annuli, the coolant passageways in the cylinder head include a longitudinally extending header, horizontally extending web ducts extending radially inward from the annuli and vertically extending connecting conduits inclined relative to the cylinder axes interconnecting the web ducts and the header. Each connecting conduit extends through a pillar extending between the cover plate portion and the base portion of the cylinder head. The pillars are in the wind shadow of, and in a substantially parallel relationship to, injection nozzles installed in the cylinder head.

11 Claims, 4 Drawing Sheets

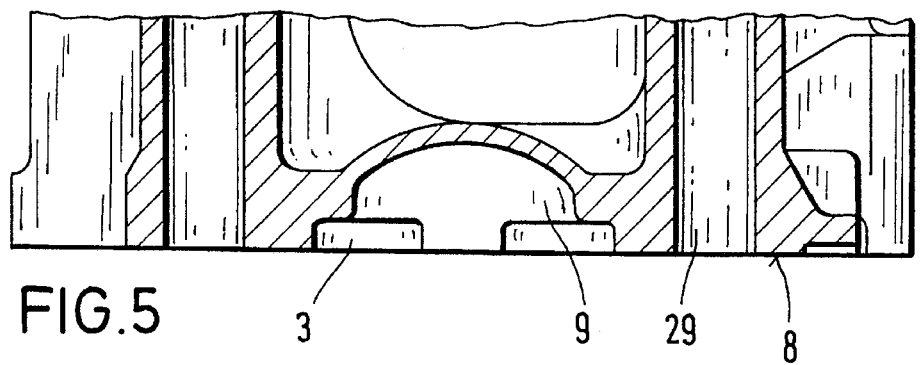
FIG.5
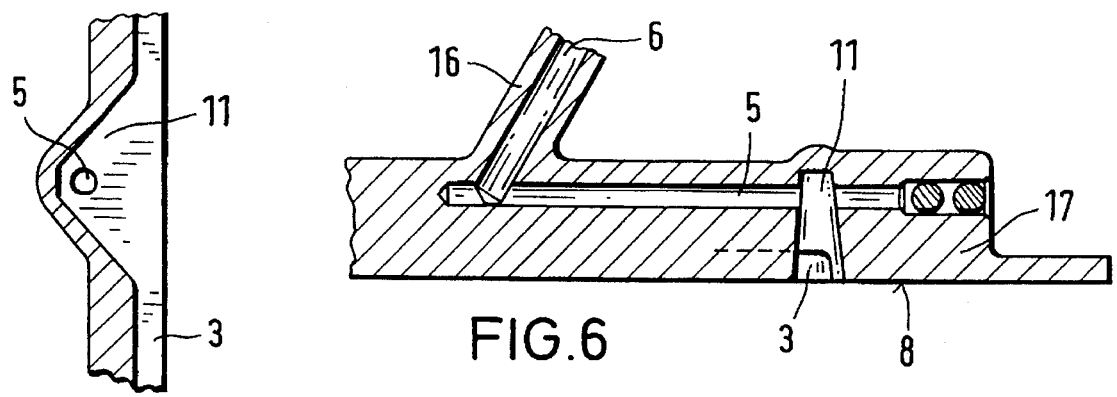
FIG.7
FIG.6
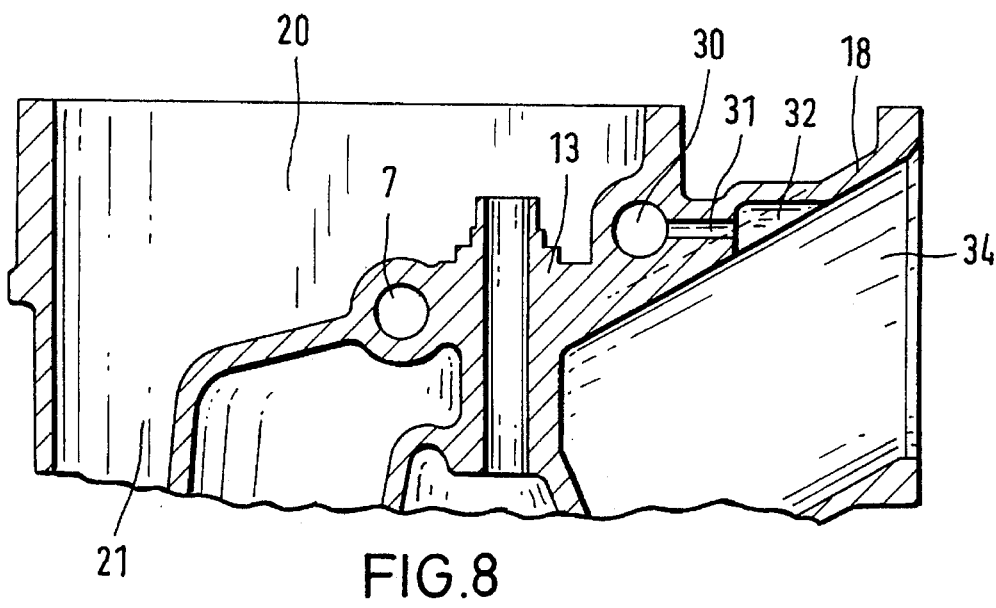
FIG.8

5,551,382

COOLING SYSTEM FOR AN INTERNAL COMBUSTION ENGINE

TECHNICAL FIELD

This invention relates to a reciprocating internal combustion engine and in particular to a cylinder head construction suitable for both liquid cooled and air cooled engines.

PRIOR ART STATEMENTS

In German Patent document EP-B 0 268 988 there is described a reciprocating internal combustion engine whose cylinder crankcase is liquid-cooled and that is optionally combinable with a liquid-cooled or an air-cooled cylinder head. A substantial manufacturing and spare parts cost is associated with this solution.

OBJECTS AND SUMMARY OF THE INVENTION

It is an object of the invention to reduce the manufacturing and spare parts cost associated with an internal combustion engine.

This object is achieved by providing a unified block-type cylinder head for a plurality of cylinders rather than individual cylinder heads, which simplifies construction and reduces space requirements. By using a unified cylinder head for liquid cooling and air cooling, one cylinder head variant is saved and thus a further simplification and cost reduction for manufacturing and spare parts management is achieved. The liquid cooling of the cylinder head according to the invention is here utilized in every case. The cooling fins come into action only in case a cooling air fan is permanently installed on the engine, while the cylinder head in the case of a remotely installed cooling system is exclusively liquid-cooled.

The arrangement of the annulus and of the web duct effects intensive liquid cooling of the portions of the cylinder head subjected to the greatest thermal load. The web duct terminates in the region between the intake and exhaust valves. It may, however, be advantageous to drill the web duct through to the opposite-lying part of the annulus and to have a further web duct from the annulus open into the original web duct below an exhaust duct.

A collecting header is provided, which is arranged parallel to the lengthwise extent of the cylinder head, and is connected in free flow communication with the web ducts by way of connecting circuits. The compulsory flow from the liquid-cooled cylinder crankcase through the cooling spaces of the cylinder head, namely the web ducts, the connecting conduit and the annulus, insures the intensive cooling of said cylinder head.

The cylinder crankcase has cooling spaces surrounding the cylinder liners which open toward the cylinder head. The annulus is formed as an annular groove in cylinder head seal surface facing the cylinder crankcase. The annulus is separated from the cooling spaces of the cylinder crankcase by a cylinder head gasket provided with inlet holes which permit free flow of engine coolant from the cylinder crankcase to the annuli in the cylinder head. In this fashion, an easily fabricated annulus is created for the cooling of the seal portion of the cylinder head. The compulsory circulation in the annulus is effected by means of covering the annular groove by means of cylinder head gasket in connection with purposely arranged holes therein.

The cooling of the cylinder head by means of the annulus can also be effected in connection with a cylinder crankcase closed toward the cylinder head.

By means of an advantageous development of the invention in which the annuli in the region between the cylinders has an intersection region having a recess in the shape of a circular arc, it is achieved that the cylinder head seal surface can expand freely. By this means and by means of the intensive cooling, the roundness of the valve seat rings and the durability of the cylinder head gasket are guaranteed.

It is advantageous that the web ducts are arranged spaced apart and roughly parallel to the cylinder head seal surface in the cylinder head base and pass through the annulus from an exterior surface of the block-type cylinder head and extend at least into the region between the intake and exhaust valves. In this fashion, especially intensive cooling is provided for the web portion between the valve seat rings of the intake and exhaust valves that is subjected to especially high thermal load. The web duct is realized in a simple fashion from outside, via a surface specially arranged therefor perpendicular to the duct direction. The passage through the annulus effects a simple connection of the web duct to the liquid circulation.

By means of an advantageous development of the invention in which the annulus has a roof-shaped recess in the region of the web ducts, the depth of which recess exceeds the contour of the web duct, it is achieved that the annulus depth necessary for the connection of the web duct is locally secured despite the relatively slight cut depth of the annulus.

It is also advantageous that the cylinder head has an injection nozzle hole installed obliquely to the long side of said cylinder head and valve stem guides for the intake and exhaust valves, and that the collecting header is arranged on the injection valve side of said cylinder head and adjacent to the valve stem guides. In this fashion, the valve stem guides subjected to high thermal stress are intensively cooled. At the same time, in the version with integrated cooling system, the collecting header is intensively cooled by means of the cooling air. In order to render the cooling more intensive, the collecting header can be provided with transverse fins.

It is further advantageous that bearing surfaces of a cover plate of the cylinder head are provided from which the connecting conduit is drilled through the collecting header and through pillars to the web ducts. In this fashion, a flow connection is established in simple form between the collecting header and the web ducts. Furthermore, by the prolongation of the connecting conduit up to the cover plate bearing surface, the rocker arm bracket or the rocker arm bearing mounted thereon is lubricated. This, however, holds true only when oil is used as coolant. If a non-lubricating medium such as, for example, water serves as coolant, the connecting conduit must be sealed off with respect to the cover plate. The rocker arm bearings then require their own supply of lubricating oil.

The pillars extending between the cover plate and the cylinder head base are inclined in the range from 15° to 25° to the cylinder axis and are arranged between and approximately equal distance from the valve stem guides and between the intake duct walls and exhaust duct walls. The pillars perform a supporting function and are arranged in the wind shadow of the injection nozzle. In this position the pillars do not hinder the supply of cooling air to the injection nozzle and the part of the cylinder head in which it is mounted. The same end is also served by having the pillars, in which the connecting conduits are formed, stand free of the intake duct walls and exhaust duct walls.

The part of the cylinder head swept by cooling air is formed during casting by means of a one-piece air jacket core. Smaller inaccuracies and reduced costs are incurred in the fabrication and assembly of the cores in comparison with those which use a multi-part core.

It is advantageous that the cores for the intake duct and exhaust duct have a multiple core print and are threadable through the air jacket core. In this fashion, an exact correlation of the individual ducts to the respective cylinder units is guaranteed, which is a correct precondition for uniform air swirl and uniform cylinder filling. Furthermore, fabrication and assembly of the cores are rendered much simpler and less costly in comparison with individual cores.

It is further advantageous that a single core is provided in order to form valve spring compartments having push rod openings and the upper halves of the intake duct walls and exhaust duct walls. Here too, the arrangement according to the invention leads to greater accuracy and simultaneously simpler fabricability in comparison with multi-part cores.

By having the exhaust duct walls largely free of the valve spring compartments and the cylinder head base, the heat flow between the hot exhaust ducts and the rest of the cylinder head is suppressed to the greatest possible extent. This leads to thermal relief of the cylinder head and effects a minimization of the cooling effort.

Partitions are provided in prolongation of the valve spring compartment walls, which partitions extend to the exhaust duct walls and have cooling air holes. The cylinder head portion supporting the rocker arm brackets is fixedly connected to the lower part, by the partitions thus optimizing the transmission of force. The cooling air holes in the partitions effect intensive cooling of the hot exhaust duct region.

It is advantageous that the exhaust duct walls have exhaust duct flanges having upper flange holes and that, in the drilling of the upper flange holes, one of the cooling air holes is made with the same tool. In this fashion, the drilling of the cooling air holes in the partitions is rendered simpler and less costly, because the cooling air holes and the flange holes are fabricated in one operation.

The cylinder head base has a thickening in the region between the push rod openings and the pillar which increases the flexural stiffness of the cylinder head base in the region of the annulus. When tightening the cylinder head bolts on such a cylinder head a uniform tightening pressure is exerted on the cylinder head seal surface and thus a reliable sealing of the oil and gas spaces is achieved.

BRIEF DESCRIPTION OF THE DRAWINGS

Further features of the invention follow from the description and the drawings in which:

FIG. 5 is a cross section taken along the V—V in FIG. 1 showing the intersection region of the annuli of the cylinder head.

FIG. 6 is a cross section through a web duct.

FIG. 7 is a cross section through the roof-shaped recess of the annulus.

FIG. 8 is a cross section through the intake valve plane of the cylinder head.

DETAILED DESCRIPTION OF THE DRAWINGS

Figure 1:
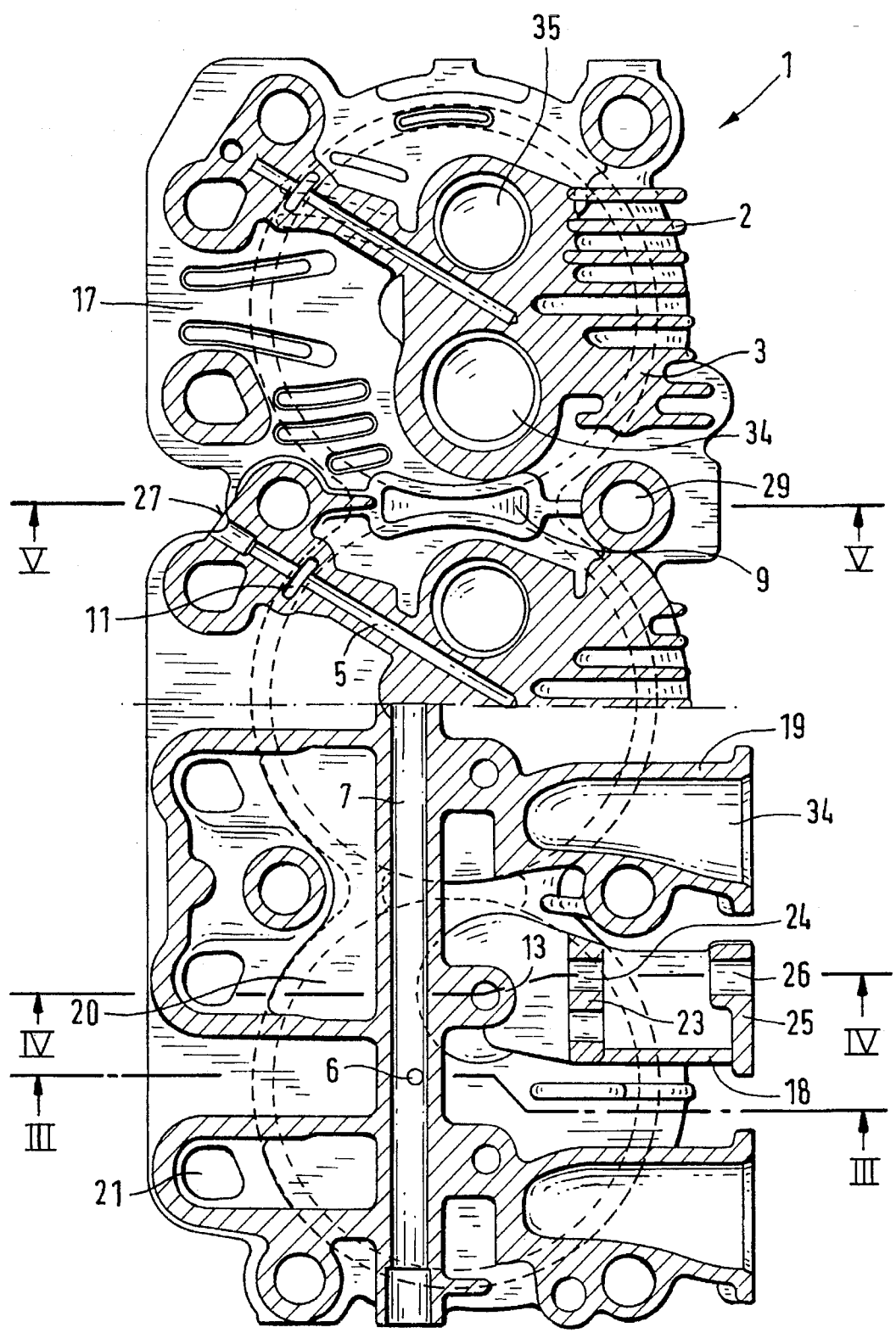
FIG. 1 is a horizontal section of the cylinder head in two distinct planes.

FIG. 1 shows a cylinder head 1 in block construction for three cylinders, which cylinder head is sectioned horizontally in two distinct planes. In the upper half of FIG. 1, cooling fins 2 are shown, which cooling fins are joined with a cylinder head base 17. Furthermore, web ducts 5 are visible, which ducts extend from an exterior surface 27 into the region between the intake duct 34 and the exhaust duct 35.

The lower half of FIG. 1 shows a section through a collecting header 7, through-intake ducts 34, through a partition 23 having cooling air holes 24, and through an exhaust duct flange 25 having an upper tapped flange hole 26. Furthermore, a valve spring compartment 20 having push rod openings 21 is illustrated. Annuli 3 are shown by dashed lines, which annuli in their intersection region between the individual cylinders have a recess 9 in the shape of a circular arc, which is illustrated in section in the upper part of FIG. 1.

Figure 2:
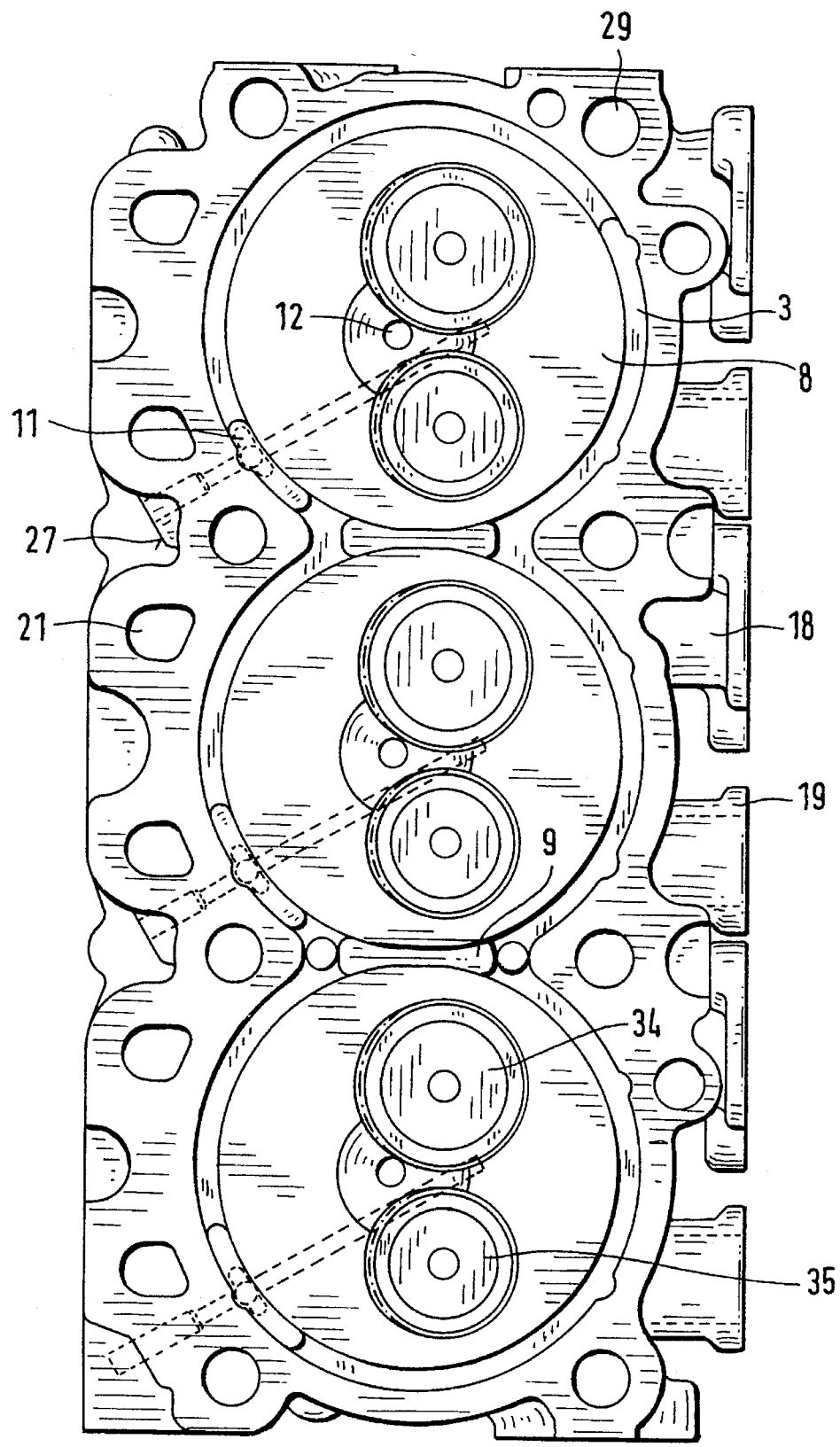
FIG. 2 is a view of the seal surface of the cylinder head.

FIG. 2 shows a view of the cylinder head seal surface 8 of cylinder head 1. Shown coaxially with the cylinders, are the annuli 3 having the intersection regions 9 between the cylinders. The annuli 3 have, in the intersection region with the web ducts 5, roof-shaped recesses 11, which effect a flow connection between annuli 3 and web ducts 5. The injection nozzle hole 12 can be seen between the intake duct 34 and the exhaust duct 35. Also present are the push rod penetrations 21 and the cylinder head bolt holes 29. Further, the exterior surfaces 27 can be seen, from which surfaces the machining of the web ducts 5 begins.

Figure 3:
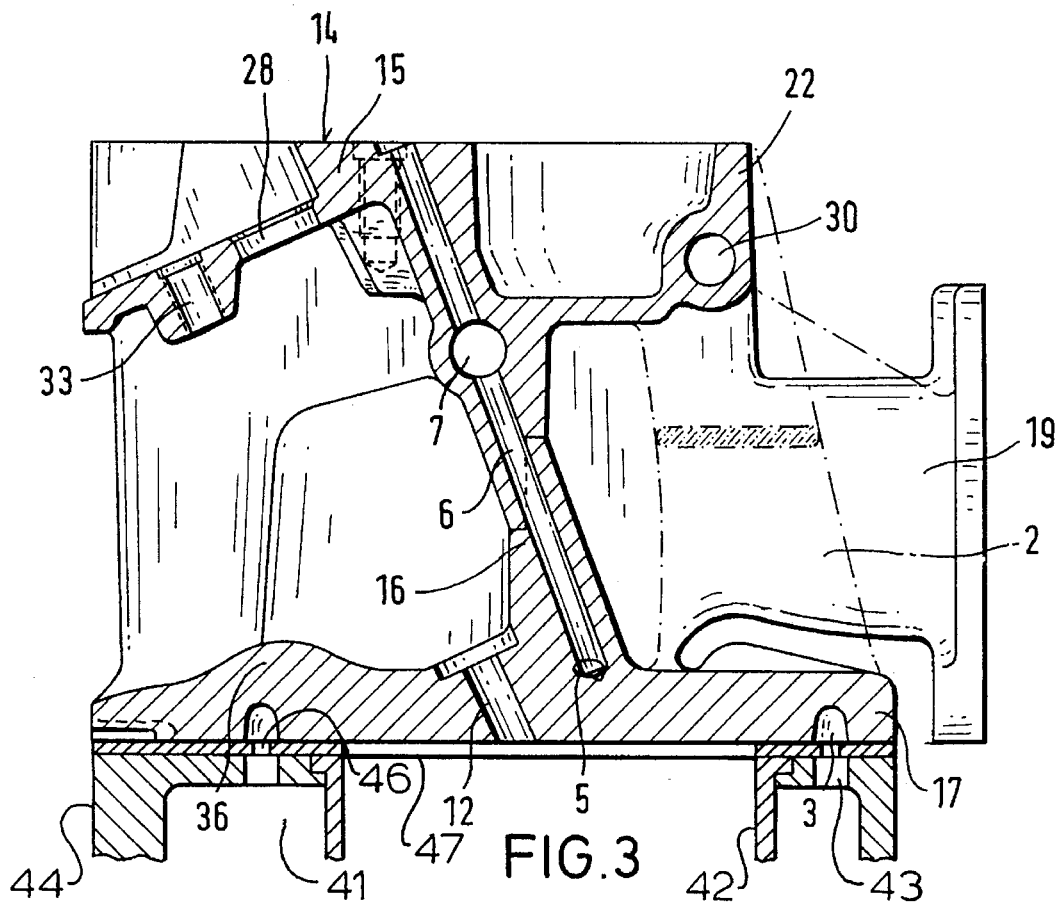
FIG. 3 is a cross section taken along line III—III in FIG. 1.

FIG. 3 shows a cross section through the cylinder head 1 in the plane of the injection nozzle hole 12 and of the associated injection nozzle guide 28 having tapped hole 33. Furthermore, a connecting conduit 6 is sectioned, which conduit makes a connection between the web duct 5 and the collecting header 7. It starts from a bearing surface 14 of a cover plate 15 of the cylinder head 1. On the bearing surface 14 is mounted a rocker arm bracket, not illustrated, whose support points are in flow connection with the open end of the connecting conduit 6. The connecting conduit 6 is made in a pillar 16, which is arranged in the wind shadow of an injection nozzle mount, not illustrated. The pillar inclination to the cylinder axis is 15° to 25°, which roughly corresponds to the inclination of the injection nozzle mount, not illustrated. FIG. 3 also shows the annulus 3, which is made as a shallow, open, U-shaped groove in the cylinder head base 17. Further, a vent passage 30 for the crankcase gases is provided. A cooling fin 2 arranged between intake duct 34 and exhaust duct 35 is indicated by dot-dash lines in FIG. 3. FIG. 3 also shows an exhaust duct wall 19, which stands largely free of the cylinder head base 17.

Figure 4:
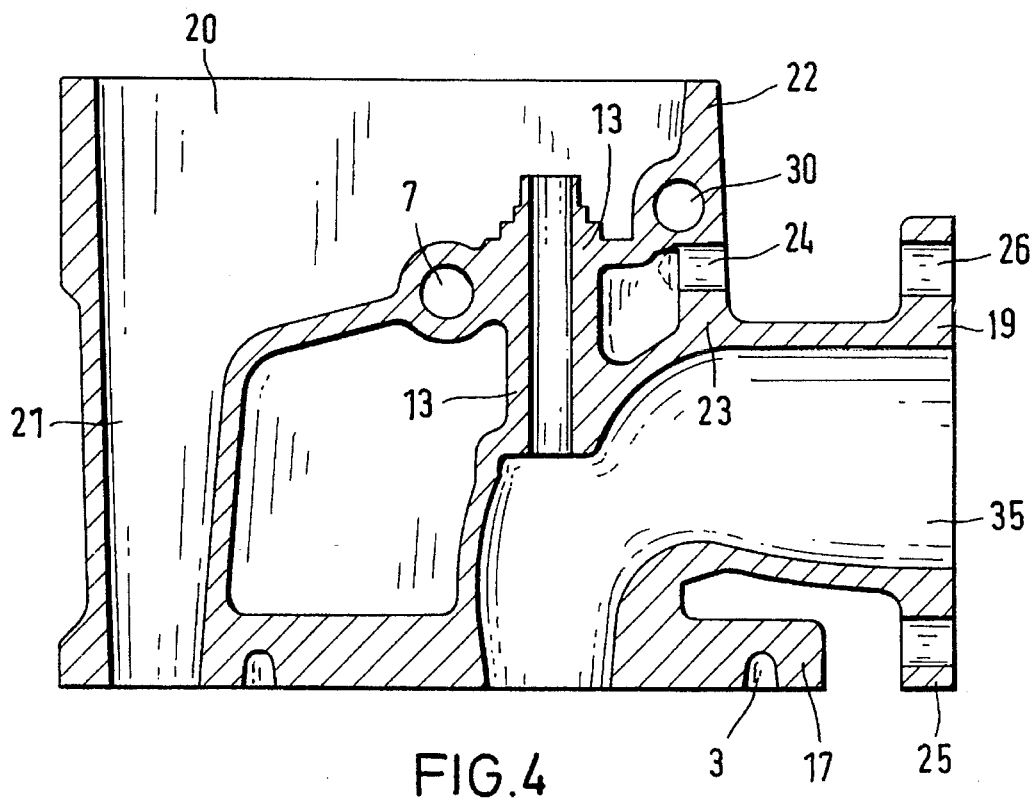
FIG. 4 is a cross section taken along line IV—IV in FIG. 1.

In FIG. 4, a cross section through the cylinder head 1 in the plane of a valve stem guide 13 of an exhaust valve is illustrated. Also shown in the section are a valve spring compartment 20 having the push rod opening 21, a partition 23 having a cooling air hole 24, and an exhaust duct 35 having an exhaust duct flange 25 and an upper tapped flange hole 26. The cooling air hole 24 and the upper tapped flange hole 26 are aligned so that they are to be drilled in one operation with the same tool. The collecting header 7 illustrated in the cross section of FIG. 4 is located immediately next to the valve stem guide 13, for the cooling of which, among other purposes, it serves.

Illustrated in FIG. 5 is the intersection region of the annuli 3 with the recess 9 in the shape of a circular arc. The recess serves for the free lengthwise expansion of the cylinder head, especially between the individual cylinders. By this construction, the roundness of the valve seats of the intake and exhaust valves and the durability of the cylinder head gasket is maintained.

FIG. 6 shows in section a web duct 5 and a connecting hole 6 with the hole channel 16. Also apparent is the position of the roof-shaped recess 11 of the annulus 3. The exact shape of the roof-shaped recess 11 follows from a section through said recess in FIG. 7. It is clear how the oil moves from the annulus 3 via the roof-shaped recess 11 into the web duct.

FIG. 8 shows a section through the valve stem guide 13 of the intake valve and of the intake duct 34. Furthermore, the vent line 30 having a vent hole 31 and a pocket 32 are illustrated, from which pocket the vent hole 31 is drilled into the vent passage 30. The collecting header 7 also leads past the valve stem guide 13 of the intake valve and cools the same.

OPERATION OF THE INVENTION

The cooling oil passes from the cooling spaces 41 surrounding the cylinder lines 42 through opening 43 in the cylinder block 44, via holes 46 of a cylinder head gasket 47 into the annuli 3. From there, it passes via the roof-shaped recesses 11 into the web duct 5 and further via the connecting holes 6 into the collecting header 7. In this fashion, intensive cooling of the cylinder head gasket region and of the cylinder head base 17, particularly between the exhaust duct 35 and the intake duct 34, is achieved. For engines subjected to especially high thermal loads, the web duct 5 can be drilled through beyond the web region to the opposite-lying part of the annulus 3. Also conceivable is an additional duct, indicated by a center line, below the exhaust duct 35 in the direction of web duct 5. By the arrangement of the collecting header 7 in the vicinity of the valve stem guides 13, the latter are intensively cooled. Because the collecting header 7 is located on the sides of the cylinder head 1 blown against by the cooling air, the collecting header is also additionally cooled by the cooling air.

The vent line 30 leads oil-containing vapors from the crankcase via the vent hole 31 into the intake duct 34, by which means the intake valve seat is lubricated and its wear is reduced.

What is claimed is:

1. A reciprocating internal combustion engine including a cylinder crankcase having at least two cylinders cooled by liquid flowing in cooling spaces in said cylinder crankcase, a block type cylinder head elongated in one direction and having a bottom base adapted for mounting on top of said cylinder crankcase with seal surfaces for said cylinders, said cylinder head (1) including at least one laterally extending intake duct for each cylinder including an intake valve opening in said base, at least one laterally extending exhaust duct for each cylinder including an exhaust valve opening in said base, laterally extending vertical cooling fans (2) for air cooling formed on said cylinder head above said bottom base, a liquid cooling annulus (3) in said base for each cylinder, each annulus being disposed coaxial with its associated cylinder and outside of said seal surfaces, said annulus being in free flow fluid communication with one of said cooling spaces in said cylinder crankcase, a web duct (5) extending from each annulus (3) to at least between said intake valve and exhaust valve openings of the associated cylinder, a collecting header (7) spaced above said web ducts and extending in said one direction, a pillar (16) extending upwardly from said bottom base above each cylinder said pillar (16) being independent of said intake and exhaust ducts and a connecting conduit (6) in said pillar (16) interconnecting said web duct (5) and said collecting header (7), said annulus, said connecting conduit (6) and said web duct (5) being in fluid communication with one another, with said collecting header (7) and with at least one of said cooling spaces of said cylinder crankcase.

2. The reciprocating internal combustion engine, of claim 1 wherein each cylinder is defined by a cylinder liner, wherein said cooling spaces surround said cylinder liners with openings toward said cylinder head (1), and wherein said bottom base includes a cylinder head seal surface (8) facing said cylinder crankcase in which an annular groove defining said annulus 3 is formed for each of said cylinders and further comprising a cylinder head gasket between said cylinder head and said cylinder crankcase and openings in said cylinder crankcase and cylinder head gasket connecting said cooling spaces with said annuli.

3. The reciprocating internal combustion engine of claim 1 wherein said cylinder head (1) includes a top plate (15) and wherein said pillars (16) extend to said top plate (15).

4. The reciprocating internal combustion engine of claim 1 wherein said cylinder head includes for each cylinder valve stem guides (13), intake duct walls (18) and exhaust duct walls (19) and wherein each of said pillars (16) is inclined in the range from 15° to 25° to the axis of the associated cylinder and is disposed between said intake and exhaust duct walls (18, 19) and is disposed between and approximately equal distances from said valve stem guides (13) of said associated cylinder.

5. The reciprocating internal combustion engine of claim 1 wherein said annulus (3) has a roof-shaped recess (11) at the intersection of said duct hole (5) with said annulus (3), the depth said recess (11) exceeding the diameter of said web duct (5).

6. The reciprocating internal combustion engine of claim 1 wherein said cylinder head (1) has an injection valve hole (12) for each cylinder which is inclined relative to the axis of the associated cylinder and valve stem guides (13) for intake and exhaust valves, and wherein said collecting header (7) is disposed on the injection valve side of said cylinder head and adjacent to said valve stem guides.

7. The reciprocating internal combustion engine of claim 1 wherein said cylinder head (1) includes push rod openings (21) and a pillar (16) and wherein said cylinder head base (17) has an area (36) of increased thickness in the region between said push rod openings (21) and said pillar (16).

8. A reciprocating internal combustion engine including a cylinder crankcase having at least two cylinders cooled by liquid flowing in cooling spaces in said cylinder crankcase and an elongated block type cylinder head with a base adapted for mounting on said cylinder crankcase and having seal surfaces for said cylinders, said cylinder head (1) including at least one intake duct for each cylinder including an intake valve opening is said base, at least one exhaust duct for each cylinder including an exhaust valve opening in said base, laterally extending vertical cooling fins (2) for air cooling, a liquid cooling annulus (3) in said base for each cylinder, each annulus being disposed coaxial with its associated cylinder and outside of said seal surfaces, said annulus (3) merging in an intersection region between said cylinders forming a laterally elongated recess having an arch shape in its direction of elongation, a web duct (5) extending from each annulus (3) to at least between said intake valve and exhaust valve openings of the associated cylinder and a collecting header (7), said annulus (3) and said web duct (5) being in fluid communication with one another, with said collecting header (7) and with said cooling spaces of said cylinder crankcase.

9. A reciprocating internal combustion engine including a cylinder crankcase having at least two cylinders cooled by liquid flowing in cooling spaces in said cylinder crankcase and an elongated block type cylinder head with a base adapted for mounting on said cylinder crankcase and having seal surfaces for said cylinders, said cylinder head (1) including valve spring compartments (20), at least one intake duct for each cylinder including an intake valve opening in said base, exhaust duct walls (19) defining at least one exhaust duct for each cylinder including an exhaust valve opening in said base, laterally extending vertical cooling fins (2) for air cooling, a liquid cooling annulus (3) in said base for each cylinder, each annulus being disposed coaxial with its associated cylinder and outside of said seal surfaces, a web duct (5) extending from each annulus (3) to at least between said intake valve and exhaust valve openings of the associated cylinder, and a collecting header (7), said annulus (3) and said web duct (5) being in fluid communication with one another, with said collecting header (7) and with said cooling spaces of said cylinder crankcase, said exhaust duct walls (19) being substantially independent of said valve spring compartments (20) and substantially free of said cylinder head base (17).

10. The reciprocating internal combustion engine of claim 9 wherein said valve spring compartments (20) include upwardly extending compartment walls (22) having prolongations in the form of partitions (23) which extend downwardly to said exhaust duct walls (19) and wherein said partitions (23) have cooling air holes (24) permitting lateral flow of cooling air through said partitions (23).

11. The reciprocating internal combustion engine of claim 10 wherein said exhaust duct walls (19) include exhaust duct flanges (25) having upper flange holes (26) which align respectively, with said cooling air holes (24).

* * * * *